United States Patent
Ramasamy et al.

(10) Patent No.: US 9,874,217 B2
(45) Date of Patent: Jan. 23, 2018

(54) TURBOMACHINE SHAFT SEALING ARRANGEMENT

(71) Applicant: Cummins Ltd., Huddersfield (GB)

(72) Inventors: Prabhu Ramasamy, Huddersfield (GB); Andrew Day, Huddersfield (GB)

(73) Assignee: Cummins Ltd., Huddersfield, IN (US)

( * ) Notice: Subject to any disclaimer, the term of this patent is extended or adjusted under 35 U.S.C. 154(b) by 806 days.

(21) Appl. No.: 13/970,173

(22) Filed: Aug. 19, 2013

(65) Prior Publication Data
US 2014/0193239 A1 Jul. 10, 2014

Related U.S. Application Data

(63) Continuation of application No. 13/738,159, filed on Jan. 10, 2013, now abandoned.

(30) Foreign Application Priority Data

Jan. 13, 2012 (GB) .................. 1200542.7

(51) Int. Cl.
*F01D 11/00* (2006.01)
*F04D 29/10* (2006.01)
(Continued)

(52) U.S. Cl.
CPC ........... *F04D 29/10* (2013.01); *F01D 25/186* (2013.01); *F16C 33/6637* (2013.01);
(Continued)

(58) Field of Classification Search
CPC .... F04D 29/10; F01D 25/186; F16C 33/6637; F16C 33/76; F16C 19/184
(Continued)

(56) References Cited

U.S. PATENT DOCUMENTS 5,344,239 A * 9/1994 Stallone .............. F01D 25/164
384/99
8,668,432 B2 3/2014 Sebald et al.
(Continued)

FOREIGN PATENT DOCUMENTS

CN 201173293 Y 12/2008
CN 201568568 9/2010
(Continued)

OTHER PUBLICATIONS

European Search Report, dated Apr. 23, 2013, pp. 1-2, European Application No. 13150681, European Patent Office.
United Kingdom Search Report, dated May 3, 2012, pp. 1, United Kingdom Application No. GB1200542.7, United Kingdom Intellectual Property Office.

*Primary Examiner* — Ngoc T Nguyen
(74) *Attorney, Agent, or Firm* — Taft Stettinius & Hollister LLP

(57) ABSTRACT

A turbomachine with a rotary shaft supporting a turbine wheel is supported for rotation in a housing. The shaft extends through a bore in the housing and a bearing assembly being disposed in the bore. At least one end of the shaft has a primary seal and a secondary seal. The primary seal comprises a non-contact seal defined by an annular clearance between a first non-rotating seal element and a second seal element that rotates with the shaft. The primary seal is arranged to receive lubricating oil from the bearing assembly. An oil slinging feature is provided between the primary and secondary seals.

13 Claims, 2 Drawing Sheets

(51) Int. Cl.
   *F01D 25/18*      (2006.01)
   *F16C 33/66*      (2006.01)
   *F16C 33/76*      (2006.01)
   *F16C 19/18*      (2006.01)

(52) U.S. Cl.
   CPC .......... *F16C 33/76* (2013.01); *F05D 2220/40* (2013.01); *F16C 19/184* (2013.01); *F16C 2360/24* (2013.01)

(58) Field of Classification Search
   USPC ........................................................ 415/111
   See application file for complete search history.

(56) References Cited

U.S. PATENT DOCUMENTS

| | | | | |
|---|---|---|---|---|
| 2004/0057847 A1* | 3/2004 | Wild | ...................... | F01D 25/186 |
| | | | | 415/111 |
| 2009/0269185 A1* | 10/2009 | Spencer | ................ | F01D 25/164 |
| | | | | 415/119 |
| 2010/0037855 A1* | 2/2010 | French | ..................... | F01D 25/16 |
| | | | | 123/323 |

FOREIGN PATENT DOCUMENTS

| | | | |
|---|---|---|---|
| DE | 102008020067 A1 | 10/2009 | |
| EP | 1184609 A1 | 3/2002 | |
| WO | 2009047543 | 4/2009 | |

\* cited by examiner

TURBOMACHINE SHAFT SEALING ARRANGEMENT

The present invention relates to a rotating machine such as, for example, a turbomachine with a shaft sealing arrangement. The invention has particular, but not exclusive, application to a turbomachine in the form of a turbocharger or a power turbine.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is conventionally supported by journal and thrust bearings located within a central bearing housing connected between the turbine and compressor wheel housing. A turbocharger shaft may rotate at speeds of up to around 150,00 rpm and it is therefore important to ensure the bearings are adequately lubricated during turbocharger operation.

It is known for a turbocharger shaft to be supported by ball bearings but they are usually supplemented with a squeeze film damper arrangement in order to counter noise, vibration and harshness and to improve the life expectancy of the bearings Providing an effective sealing system to prevent oil leakage from the central bearing housing into the compressor or turbine housing can be problematic. Oil leakage, particularly the compressor end of the turbocharger, is a problem as at low boost pressures (e.g. when the engine is idling or when the turbocharger is operated in engine braking mode) there can be a significant pressure drop from the bearing housing to the compressor housing which encourages oil leakage into the compressor housing. In order to counter such leakage it is conventional to include an oil slinger as part of a thrust bearing assembly at the compressor end of the bearing housing. An oil slinger is an annular component which rotates with the turbocharger shaft and has surfaces or passages arranged for propelling oil away from the shaft as it rotates, and in particular from the passage through the bearing housing into the compressor housing. Generally an annular splash chamber defined in the bearing housing collects the oil displaced by the slinger provides for its recirculation and typically allows it to drain to a sump.

Whereas the turbine of a turbocharger drives a compressor, in a power turbine the end of the turbine shaft remote from the turbine wheel transmits power via a mechanical coupling. In a turbocompound engine two turbines are provide in series with a power turbine connected in series with the turbine of a turbocharger. The power turbine is used to generate additional power and a gear wheel may be fixed to the end of the power turbine shaft in order to transmit that power to the crankshaft of the engine via an appropriate coupling (such as for example a fluid coupling or a gear or other drive mechanism), hydraulically, mechanically or electrically. As with a turbocharger, the shaft of a power turbine is supported on bearing assemblies, including appropriate lubricating systems, located within a bearing housing connected to the turbine housing. The bearing arrangement at the turbine end of the shaft may be substantially the same as that found in a turbocharger, although the bearing arrangement at the drive end of the shaft may be a ball bearing assembly.

In turbocharger applications where the shaft rotation speeds are high, positive contact seals are undesirable as they would be subject to significant wear at the contact surfaces and would contribute to high friction losses. Non-contact sealing arrangements are thus generally adopted.

In existing turbocharger bearing housings a labyrinth sealing arrangement is typically provided by one or more sealing rings (piston-type rings). The ring is supported by the housing, projects into an annular groove defined in an outer surface of the shaft and/or a component mounted on the shaft. The ring seal regulates gas flow into the low pressure bearing housing from the high pressure turbine and compressor housings such that the pressure differential is maintained to reduce the risk of oil leaking from the bearing housing into the turbine and compressor housings.

It is an object of the present invention to provide for an improved or alternative shaft sealing arrangement for a turbomachine.

According to the present invention there is provided a turbomachine comprising: a shaft rotatable about a rotational axis; a turbine wheel provided at one end of the shaft for rotation about the rotational axis within a turbine housing; the shaft being supported for rotation in a bearing housing by a bearing assembly, the bearing housing having a bore through which the shaft extends, the bearing assembly being disposed in the bore; wherein at least one end of the shaft has a primary seal and a secondary seal, the primary seal comprising a non-contact seal defined by an annular clearance between a first non-rotating seal element and a second seal element that rotates with the shaft, the primary seal being arranged to receive lubricating fluid from the bearing assembly, an oil slinging feature being provided between the primary and secondary seals.

The primary seal may be disposed at an axial location between the bearing assembly and the secondary seal. Alternatively, it may be defined at one end of the bearing assembly.

The first seal element of the primary seal may be fixed relative to the bearing housing. It may be defined by an axial thrust bearing or may be defined by a projection from the bearing housing, such as, for example a rib, which may be integrally formed with, or otherwise fixed to, the bearing housing. The projection is preferably annular.

The annular clearance of the primary seal preferably extends in the axial direction only, without any radial component.

The annular clearance of the primary seal preferably has a radial depth of at least 0.05 mm. It may be greater than 0.075 mm. The annular clearance preferably has a radial depth of less than, or equal to, 0.15 mm, more preferably less than, or equal to, 0.01 mm and more preferably still less than, or equal to, 0.082 mm.

There may be provided first and second primary seals, one at each end of the shaft and at or near opposite ends of the bearing assembly. The annular clearance of the first primary seal at the turbine end may have a radial depth at least 0.05 mm and no more than 0.082 mm. The annular clearance of a second primary seal at the opposite end may have a radial depth of at least 0.075 mm and no more than 0.125 mm.

The second seal element may be a non-contacting seal. It may be defined by the shaft, such as for example, a projection that is integrally formed with the shaft, or may be defined by a component that is fixed to the shaft for rotation therewith. The second seal element is preferably annular.

The secondary seal may comprise one or more piston seals that are supported on a surface of the bearing housing and extend radially into a corresponding annular groove defined in the shaft. The piston seals may be slidably disposed on the surface of the bearing housing.

The bearing assembly may comprise a squeeze film damper with a radial clearance between its outer surface and a surface that defines the bore. The bearing assembly preferably comprises a rolling bearing element. It may be in the form of a cartridge comprising an inner ring, an outer ring and at least one intermediate rolling bearing element. The rolling bearing element may be a roller or a sphere. The roller may be substantially cylindrical. In one embodiment the roller is tapered.

The primary seal may be provided between the inner and outer races or between the outer race and the shaft or a component fixed to the shaft. The first non-rotating element may be defined by the outer ring of the bearing. The second element may be defined by the inner ring but not necessarily.

The axial thrust bearing may be in the form of a plate or disc. The first seal element may be defined by a periphery of an aperture through the bearing.

The oil slinging feature may be a dedicated oil slinger that may be a component that is separate from the shaft or integrally formed with it. The slinging feature may be supported on, or integrally formed with, a component that is fixed to the shaft for rotation therewith. Alternatively it may be provided simply by a shoulder or step defined by the shaft or a component that is fixed to the shaft for rotation therewith.

The oil slinging feature may be defined by a surface of a radial inward recess, such as for example an annular undercut, or by a surface of an outward projection such as, for example, an annular rib.

The oil slinging feature may be provided on, or defined by, the inner race of the bearing.

The second element may be defined by a sealing boss of the shaft, which may be a separate component or may be integrally formed with the shaft.

The turbomachine may be a turbocharger in which case a compressor wheel is mounted to the other end of the shaft for rotation about said axis within a compressor housing.

A specific embodiment of the present invention will now be described, by way of example only, with reference to the accompanying drawings in which.

Figure 1:
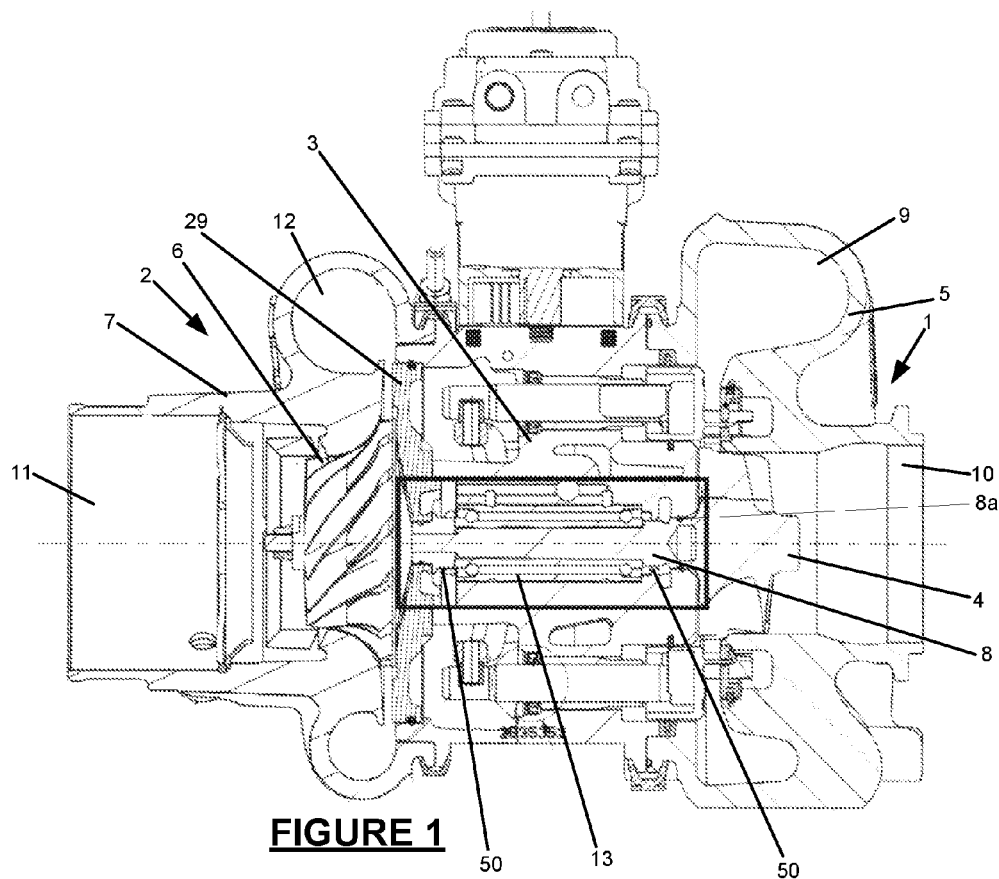
FIG. 1 is a sectioned view along the longitudinal axis of a turbocharger embodying the present invention, with a bearing and sealing arrangement being highlighted by a thick-lined rectangular box.
Figure 2:
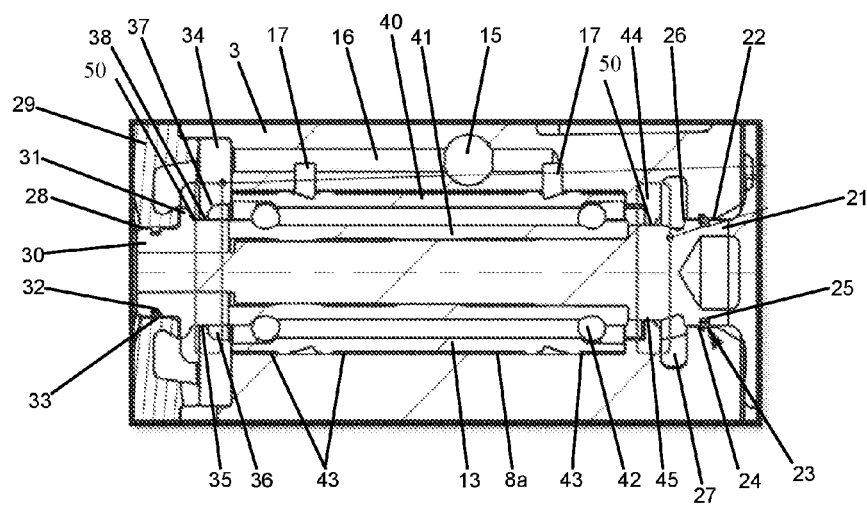
FIG. 2 is an enlarged view of the bearing and sealing arrangement of the turbocharger of FIG. 1.
Figure 3:
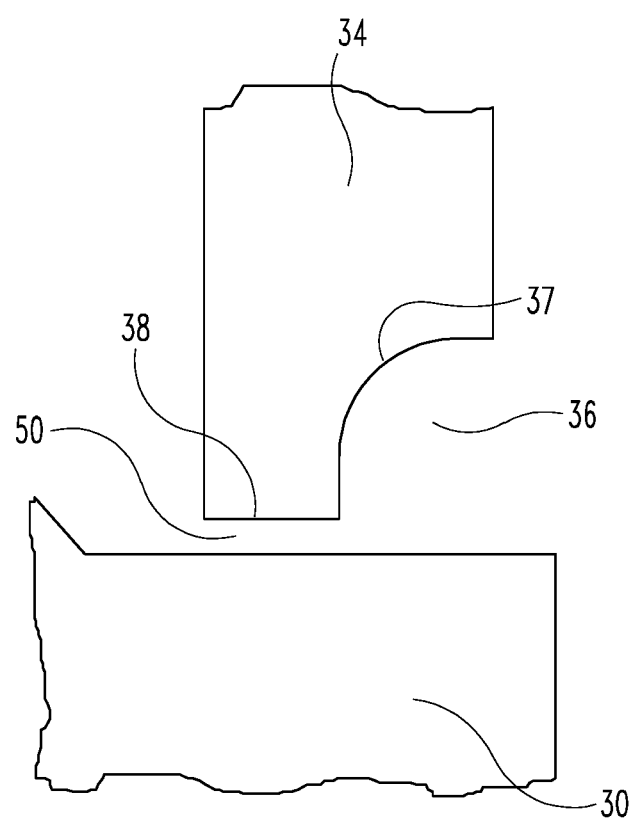
FIG. 3 is an enlarged view of the primary seal 50 of FIG. 1 and FIG. 2.

Referring now to the drawings, the illustrated turbocharger comprises a turbine 1 connected to a compressor 2 via a central bearing housing 3. The turbine 1 comprises a turbine wheel 4 rotating within a turbine housing 5. Similarly, the compressor 2 comprises a compressor impeller 6 that rotates within a compressor housing 7. The turbine wheel 4 and compressor impeller 6 are mounted on opposite ends of a common turbocharger shaft 8 that extends through axial bore 8a of the central bearing housing 3.

In use, the turbine wheel 4 is rotated by exhaust gas from an outlet manifold of an internal combustion engine. The exhaust gas flows from an inlet 9 to an exhaust gas outlet 10. Rotation of the turbine wheel 4 in turn rotates the compressor wheel 6, which draws intake air through a compressor inlet 11 and delivers boost air to the inlet manifold of the internal combustion engine via an outlet volute 12.

The turbocharger shaft 8 rotates within a bearing 13 housed in the bore 8a of the bearing housing 3. Oil is fed to the bearings under pressure from the oil system of the engine via an oil inlet 15, gallery 16 and passages 17.

The turbine wheel 4 is connected to the turbocharger shaft 8 at an integrally formed seal boss 21, which extends through a turbine end 22 of the bore 8a. The boss 21, which has a larger diameter than that of the rest of the shaft 8, is sealed with respect to the bore 8a by means of a piston ring 23 and groove combination. The piston ring 23 is supported by an annular wall 24 that defines the turbine end of the bore 8a. The piston ring 23 extends radially inwards into an annular groove 25 defined in the outer surface of the boss 21 so as to provide a seal. Axially in-board of the groove 25 the outer surface of the boss 21 has a recessed profile to define a first oil slinger 26. The area of the bearing housing 3 that surrounds the oil slinger 26 is recessed to define an annular chamber 27 for that captures the dispersed oil and includes a drain.

At the opposite end of the bearing housing 3, the shaft 8 passes through a central bore 28 in a compressor housing back plate 29 that forms part of the bearing housing 3 and separates the interior from the interior of the compressor housing 7. Fixed to the shaft 8 at this end is a boss 30 that has a first and second portions separated by an integrally formed second oil slinger 31 that projects radially outwards at approximately half-way along the length of the boss 30. The first portion of the boss 30 is disposed inside the bearing housing 3 and the second portion extends in the bore 28 in the back plate 29. The outer surface of the second portion of the boss 30 has an annular groove 32 that receives a piston ring 33 to provide a seal in the same manner that at the turbine end 22. The piston ring 33 is supported on a surface of the compressor back plate 29 that defines the bore 8a.

An annular thrust plate 34 is fixed to relative to the bearing housing 3 and located around the first portion of the boss 30, between the oil slinger 31 and the end of the bearing 13. The plate 34 has a radial dimension that extends beyond that of the bearing 13 and bears against a surface of the back plate 29 at its outer periphery. In use, the plate 34 is designed to resist axial thrust forces imparted by the bearing 13.

The inner periphery of the thrust plate 34 has a central circular aperture 35 that extends axially between the radial faces of the plate and is designed for receipt of the first portion of the boss 30. On the bearing side, an annular recess 36 in the radial surface of the plate effectively enlarges the aperture 35 in the radial direction. The recess 36 does not extend across the full axial extent of the plate 34 thus leaving a narrow land 37 on the inner periphery of the plate 34. The land 37 defines an annular sealing surface 38 that is positioned in close proximity to part of the outer surface of the boss 30 so as to provide a non-contact seal 50. For convenience, this seal is referred to as a primary seal 50 on the basis that it is disposed axially inboard of the piston ring 33 and therefore is the first seal encountered by oil flowing towards the compressor. The piston ring 33 in combination with the groove 32 thus becomes a secondary seal.

The bearing 13 is in the form of a cartridge having inner and outer rings 40, 41 that are radially separated by bearing elements 42. The outer ring 41 is received in the bore 8a of the bearing housing 3 between the axial thrust plate 34 and a shoulder 39 and is fixed against rotation by means of a pin (not shown). The inner ring 40 is fixed to the shaft with a light interference fit. The two rings 40, 41 are axially elongated and have inwardly facing surfaces that each define a pair of axially spaced races for the bearing elements 42, which in this instance are in the form of spheres. It will be appreciated that other bearing element designs may be used such as, for example, rollers which may be cylindrical, barrel-shaped or tapered.

The outer surface of the outer ring 41 has a plurality of shallow annular recesses 43 for receipt of lubricating oil. These provide annular clearances between the bearing housing 3 and the outer surface of the bearing cartridge 13 of around 0.03 mm or less.

During operation of the turbocharger, oil is fed to the bearing 13 under pressure from the oil system of the engine. The oil egresses from passages 17 and floods the recesses 43 so as to provide a thin film of oil between the outer ring 41 of the bearing 13 and the bearing housing 3. The film acts as a squeeze film damper and damps vibration caused by rotation of the shaft 8. From there the oil flows into the bearing 13 through small holes (not shown) in the outer ring 41.

Towards the turbine end 22 of the bore 8a, between the bearing 13 and the first oil slinger 26, there is an annular rib 44 integrally formed with the bearing housing 13. The rib 44 projects radially inwards and defines an annular sealing surface 45 that surrounds the outer surface of the boss 21 in close proximity. The rib 44 thus provides a further non-contact primary seal 50 that is located axially inboard of the secondary seal afforded by the piston ring 23 and groove 25 combination.

The primary seals 50, being of the non-contact type, each provide a narrow radial clearance around the respective boss 21, 30 and serve to restrict the flow of oil from the bearing housing 3 towards the oil slingers 26, 31, the secondary seals and the compressor/turbine housings. The tight clearance restricts and guides a major portion of the oil to drain, with only a small proportion of the total oil passing to the oil slingers and secondary seals. At the compressor end the oil collects in the recess 36 defined by the axial thrust plate 34 and drains away between the thrust plate and the bearing 13. At the turbine end 22 the oil collects in a cavity between the rib 44 and the bearing 13 and egresses through an outlet (not shown) to drain.

The narrow radial clearance of the primary seals is typically in the range 50 to 100 microns, i.e. 0.05 to 0.1 mm, but may be up to 0.15 mm and still provide effective sealing. In one preferred embodiment the primary seal 50 at the turbine end 22 has a radial clearance in the range 0.05 to 0.082 mm whereas the primary seal at the compressor end has a radial clearance in the range 0.075 to 0.125 mm.

The axial length of the annular sealing surfaces 38, 45 should be limited to avoid excess frictional losses.

The radial dimension of the clearance and the axial length of each primary seal should be large enough to accommodate slight tilting of the turbocharger shaft, afforded by the squeeze film damper clearance, without allowing contact with the annular sealing surfaces 38, 45 but should be limited to ensure effective sealing. The primary seal clearance is also dependent on other factors such as the thermal expansion of the respective components and the axial distance between the centre of the bearing and the seal locations.

In comparison to journal bearings, roller element bearings require less oil to lubricate the races. However, with addition of the squeeze film damper the oil flow rate is similar to that required by a journal bearing. The addition of the primary seals reduces the risk of oil leaking along the shaft and into the turbine or compressor housing.

Although the invention is described in relation to a turbocharger it is to be understood that it has application to any sort of turbomachine. For example, the turbine may be used to drive any other suitable device other than a compressor including, for example, a generator.

It will be appreciated that numerous modifications to the above described design may be made without departing from the scope of the invention as defined in the appended claims. For example, the boss 21 at the turbine end of the shaft may be a separate component mounted on or otherwise connected to the shaft. In one embodiment it may be integrally formed with the turbine wheel and connected to the shaft. Similarly the boss 30 at the compressor end of the shaft 8 may be integrally formed with the rest of the shaft or may be integrally formed with the compressor impeller 6. The oil slinging feature may be defined by a part of the inner race of the bearing that extends axially beyond the outer race. It may take the form of surface defined by an annular undercut or by an annular projection. It will be appreciated that such a slinger is thus spaced from the bearing area The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A turbomachine comprising: a shaft rotatable about a rotational axis; a turbine wheel provided at one end of the shaft for rotation about the rotational axis within a turbine housing; the shaft being supported for rotation in a bearing housing by a bearing assembly, the bearing housing having a bore through which the shaft extends, the bearing assembly being disposed in the bore; wherein at least one end of the shaft has a primary seal and a secondary seal, the primary seal comprising a non-contact seal formed by an annular clearance between an annular thrust plate fixed relative to the bearing housing and an outer surface of a boss fixed to the shaft that rotates with the shaft, the primary seal being arranged to receive lubricating oil from the bearing, assembly, an oil slinger being provided between the primary and secondary seals, wherein the thrust plate has an inner periphery and an outer periphery, the inner periphery of the thrust plate has a central circular aperture that extends axially between radial faces of the plate, for receipt of the boss, an annular recess in a radial face of the plate enlarges the aperture in the radial direction, the recess does not extend across the full axial extent of the plate thus leaving a narrow land on the inner periphery of the plate which defines an annular sealing surface that is positioned in proximity to the outer surface of the boss to provide the non-contact seal.

2. A turbomachine according to claim 1, wherein the primary seal is disposed at an axial location between the bearing assembly and the secondary seal.

3. A turbomachine according to claim 1, wherein the primary seal is defined at one end of the bearing assembly.

4. A turbomachine according to claim 1 wherein the annular clearance has a radial depth of 0.05 mm to 0.15 mm.

5. A turbomachine according to claim 4, wherein the annular clearance has a radial depth of 0.05 to 0.082 mm.

6. A turbomachine according to claim 4, wherein the annular clearance has a radial depth of 0.075 to 0.125 mm.

7. A turbomachine according to claim 1, wherein the secondary seal comprises one or more piston seals that are supported on a surface of the bearing housing and extend into a corresponding annular groove defined in the shaft.

8. A turbomachine according to claim 1, Wherein the bearing assembly comprises a squeeze film damper with a radial clearance between its outer surface and a surface that defines the bore in the bearing housing.

9. A turbomachine according to claim 1, wherein the bearing assembly comprises a rolling bearing element.

10. A turbomachine according to claim 9, wherein the bearing assembly comprises a cartridge having an inner ring, an outer ring and at least one intermediate rolling bearing element.

11. A turbomachine according to claim 10, wherein the primary seal is provided between the inner and outer rings.

12. A turbomachine according to claim 1, wherein the oil slinger is a dedicated oil slinger that is integrally formed with the shaft or defined on a component that is fixed to the shaft.

13. A turbomachine according to claim 1, wherein a compressor connected to the opposite end of the shall to the turbine for rotation about said rotational axis within a compressor housing, thereby forming a turbocharger.

* * * * *